(12) United States Patent
Schechner et al.

(10) Patent No.: US 12,209,809 B2
(45) Date of Patent: Jan. 28, 2025

(54) DEVICE FOR AN ENERGY TRANSFER AND FOR AN ENERGY STORAGE IN A LIQUID RESERVOIR

(71) Applicant: Envola GmbH, Ulm (DE)

(72) Inventors: Alexander Schechner, Ulm (DE); Gerhard Ihle, Ulm (DE); Islam Elhelaly, Neu-Ulm (DE)

(73) Assignee: Envola GmbH, Ulm (DE)

( * ) Notice: Subject to any disclaimer, the term of this patent is extended or adjusted under 35 U.S.C. 154(b) by 214 days.

(21) Appl. No.: 18/017,723

(22) PCT Filed: Jul. 16, 2021

(86) PCT No.: PCT/EP2021/069956
§ 371 (c)(1),
(2) Date: Jan. 24, 2023

(87) PCT Pub. No.: WO2022/017977
PCT Pub. Date: Jan. 27, 2022

(65) Prior Publication Data
US 2023/0266072 A1    Aug. 24, 2023

(30) Foreign Application Priority Data
Jul. 24, 2020 (DE) ................... 10 2020 119 652.0

(51) Int. Cl.
*F28D 15/00* (2006.01)
*F28D 20/00* (2006.01)

(52) U.S. Cl.
CPC .. *F28D 20/0034* (2013.01); *F28D 2020/0078* (2013.01)

(58) Field of Classification Search
CPC ................... F28D 20/0034; F28D 2020/0078
(Continued)

(56) References Cited

U.S. PATENT DOCUMENTS

| 2,241,060 A | 5/1941 | Gibson |
| 4,281,639 A * | 8/1981 | Kuronen ............... F24S 10/503 |
| | | 165/104.19 |

(Continued)

FOREIGN PATENT DOCUMENTS

| DE | 29 26 610 A1 | 1/1981 |
| DE | 101 06 975 A1 | 9/2002 |

(Continued)

OTHER PUBLICATIONS

International Search Report in PCT/EP2021/069956, dated Nov. 9, 2021.
(Continued)

*Primary Examiner* — Davis D Hwu
(74) *Attorney, Agent, or Firm* — Collard & Roe, P.C.

(57) ABSTRACT

A device for energy transfer and for energy storage in a liquid reservoir includes a water heat exchanger and an air heat exchanger arranged above the water heat exchanger, wherein the water heat exchanger is arranged in a liquid reservoir, and wherein the device includes an outdoor air inlet from which an outdoor air flow can be induced to an air outlet through the air heat exchanger, includes a heat exchanger which is designed to direct exhaust air flowing in from an exhaust air inlet for energy transfer via the liquid reservoir (FR) into a peripheral area of the heat exchanger, from which the exhaust air can be supplied as an extract air flow to the air heat exchanger, in which the outdoor air flow and the extract air flow mix.

14 Claims, 4 Drawing Sheets

(58) Field of Classification Search
USPC .................................................. 165/104.19
See application file for complete search history.

(56) References Cited

U.S. PATENT DOCUMENTS

2018/0112930 A1   4/2018  Schechner et al.
2018/0356163 A1  12/2018  Schechner et al.

FOREIGN PATENT DOCUMENTS

| DE | 10 2015 104 909 A1 | 9/2016 |
| DE | 10 2015 121 177 A1 | 6/2017 |
| DE | 10 2018 213 274 A1 | 2/2020 |
| EP | 1 785 678 A2 | 5/2007 |
| EP | 2 620 715 A1 | 7/2013 |
| FR | 3 017 934 A1 | 8/2015 |
| KR | 10-2015-0081090 A | 7/2015 |
| WO | 03102484 A1 | 12/2003 |

OTHER PUBLICATIONS

International Search Report in PCT/EP2021/069955, mailed Oct. 27, 2021.

* cited by examiner

DEVICE FOR AN ENERGY TRANSFER AND FOR AN ENERGY STORAGE IN A LIQUID RESERVOIR

CROSS REFERENCE TO RELATED APPLICATIONS

This application is the National Stage of PCT/EP2021/066956 filed on Jul. 16, 2021, which claims priority under 35 U.S.C. § 119 of German Application No. 10 2020 119 652.0 filed on Jul. 24, 2020, the disclosure of which is incorporated by reference. The international application under PCT article 21(2) was not published in English.

The invention relates to a device for transmitting energy and for storing energy in a liquid reservoir.

From the general state of the art, it is known to take appropriate precautions during the change of seasons in order to maintain temperatures in indoor spaces in a temperature range that is comfortable for the users. Various types of heating systems are used to increase the temperature, while air conditioning units are often used to lower the temperature by bringing cooled outdoor air into the interior via a cooling compressor.

The use of fossil fuels for indoor temperature control is not only increasingly uneconomical but is also increasingly being questioned due to the associated negative impacts on the climate. Efficient systems for energy storage ensure reduced energy consumption when heating and cooling buildings.

Energy storage systems are used in so-called ventilation and air-conditioning systems, in which the outdoor air can be fed into the interior of the building as supply air via a heat exchanger by means of a radial fan. Exhaust air is often fed to the heat exchanger by means of an evaporative cooler, whereby the air drawn in by another radial fan leaves the building as extract air that mixes with the outdoor air. In addition to various filters for cleaning the air, auxiliary heaters can also be used so that interior ventilation is made possible.

Furthermore, it is known to supply outdoor air to an indoor space, whereby all indoor spaces of a building are connected by an air exhaust duct, through which the exhaust air can be supplied to a heat pump, so that the energy contained in the exhaust air can be supplied as exhaust air, for example to a hot water tank, via the heat pump before leaving the building. Such exhaust air heat pumps contribute to the energy efficiency of a building.

From DE 29 26 610 A1 a storage tank for providing the input heat energy at a low temperature level for heat pump systems is known, which absorb this energy and release it again at a higher temperature level. In this case, a water basin is designed in such a way that its water content can freeze without damaging the basin and that a heat exchange system located at the bottom of the basin or embedded in the bottom of the basin allows the cooling and freezing heat of this basin to be supplied to the cold side of a heat pump.

In addition to the use of an artificial water basin, it is also known to use natural bodies of water as a storage medium.

As such, DE 10 2015 104 909 A1 discloses an energy storage system that has a heat exchanger floating on a lower basin in the form of a lake that can preferably be filled with water via a first supply line, whereby water from the lower basin can be supplied to a heat pump in separate circuits via a second supply line and coolant that flows through the heat exchanger can be supplied to a heat pump in separate circuits via a third supply line, so that energy can be extracted via the heat exchanger through icing of the water of the lower basin or in the form of sensible heat from the water of the lower basin and can be passed on to a consumer for heat dissipation and/or for cold dissipation.

Furthermore, a floating device for introducing thermal energy into a body of water and for extracting thermal energy from the body of water is known from DE 10 2015 121 177 A1, which has a water heat exchanger which, after the device has been placed on the body of water, immerses into the water and has an inlet and an outlet for a heat transfer fluid which can release thermal energy to the body of water or extract thermal energy from the body of water. The device further comprises an air heat exchanger capable of being penetrated by ambient air, and further comprises an inlet for water originating from the body of water with a corresponding outlet so that water from the body of water can flow through the air heat exchanger, whereby heat energy is transferable between the ambient air flowing through the air heat exchanger and the water flowing through the air heat exchanger.

However, a device for transferring energy and for storing energy in a fluid reservoir can also do without natural water.

Based on this prior art, the task is to improve a device for energy transfer and for energy storage in a liquid reservoir with regard to its performance.

The solution according to claim 1 uses exhaust air, for example from a building, to improve the performance of the device.

The liquid reservoir energy transfer and storage device comprises a water heat exchanger and an air heat exchanger disposed above the water heat exchanger, the water heat exchanger being disposed in a liquid reservoir. The device comprises an outdoor air inlet which allows an induced outdoor air flow through the air heat exchanger to an air outlet. A heat exchanger is designed to direct exhaust air flowing in from an exhaust air inlet for energy transfer via the liquid reservoir into a peripheral area of the heat exchanger, from which the exhaust air can be directed as extract air flow to the air heat exchanger, in which the ambient air flow and the extract air flow mix.

Further advantageous embodiments of the invention are each the subject of the subclaims. These can be combined with each other in a technologically useful manner. The description, particularly in connection with the drawing, additionally characterises and specifies the invention.

Exhaust air is air from the building which, after contact with the outside air, is referred to as extract air. This designation is therefore chosen for the air flowing from the heat exchanger into the air heat exchanger, into which outside air also flows. Outside air can also be referred to as ambient air.

The warm exhaust air first flows, guided by the heat exchanger which also acts as an air flow deflector, over the liquid surface in the liquid reservoir, thereby releasing energy which the water heat exchanger can use, before the exhaust air is fed to the air heat exchanger as an extract air flow. As a result, there is no mixing of ambient air (also referred to as outdoor air in air-conditioning technology) and exhaust air already on the inlet side of the device, and thus the temperature is not equalized on the inlet side, which would make much worse use of the warm exhaust air. To achieve this effect, the exhaust air inlet is spaced apart from the outdoor air inlet and above the liquid reservoir.

The water heat exchanger is advantageously arranged on a floor. The liquid reservoir may be surrounded by an inner shell delimiting the device from an outer shell covering the inner shell from the ground, the outer shell being at least partially buried in the ground. In one embodiment, the device is closed off at the top by a cover such that an air flow can be induced from an air inlet to an air outlet through the air heat exchanger. The air outlet may be located centrally on the cover, and preferably a fan is located below the cover at the air outlet.

This device can thus be divided into three sections, of which the water heat exchanger is arranged at the bottom in the liquid reservoir. In the upper section is the air heat exchanger, through which the ambient air can flow. Above this air heat exchanger the cover is arranged, which can be appropriately designed to reserve outdoor space, for example in a garden of a residential house, when the device according to the invention is embedded underground up to the cover.

Typically, the active areas of the water heat exchanger and the air heat exchanger are connected to a heat pump via a hydraulic unit and typically have a glycol-water solution flowing through them for energy exchange. Energy exchange can take place in different ways. Firstly, it is possible to extract outdoor heat from the air heat exchanger via the heat pump for heating purposes. Excess outdoor heat can be fed into the water heat exchanger at the same time. If there is not enough environmental heat available from the air heat exchanger for heating purposes, it can be extracted from the water heat exchanger. Available useful heat from the air heat exchanger can be diverted and fed back into the water heat exchanger for regenerating and charging of the storage tank. In addition to extracting environmental heat from the air heat exchanger, heat can also be released via the air heat exchanger for cooling purposes. Partially, cold can be diverted and supplied to the water heat exchanger as active pre-cooling of the storage tank. A corresponding quantity of cold can also be taken from the water heat exchanger to deliver heat via the heat pump for cooling purposes by means of the air heat exchanger. Finally, it is also possible to achieve free pre-cooling of the storage for supplying free cooling via the air heat exchanger for free pre-cooling of the water heat exchanger. As a result, the device will increase the efficiency of the generation of useful heat, as the water heat exchanger can transfer ambient heat from warm days, and exhaust air energy, to the less efficient cold days, significantly increasing the efficiency. When cooling buildings and/or machinery, the effect of the device according to the invention is even more pronounced, as the cool of the night is brought into the storage to support the generation of cold during the day by low source temperatures.

In addition to this increase in efficiency, the device according to the invention is designed in such a way that it significantly facilitates the installation and operation of such a system. To this end, the outer shell is first inserted in the ground, which may be supported by a stable core during installation to prevent bulging. The liquid reservoir is formed inside the inner shell, and after removal of the core, the inner shell can be used to stabilise the outer shell, which is achieved by the outer shell covering the inner shell from the ground. This allows for a simple arrangement of the device according to the invention, which furthermore can be installed at low cost.

The heat exchanger in the device is designed to initially induce the exhaust air of a building or a machine into a central area of the heat exchanger and from there to supply it radially to the circumferential or nearly circumferential peripheral area of the heat exchanger, so that a sufficiently long distance is generated for the exhaust air to flow through the liquid reservoir for energy exchange.

The exhaust air is directed through fins in the heat exchanger that run radially at least in some areas, so that the path has at least one radial component. The fins can serve to direct the exhaust air into the central area or to induce it away from there. The heat exchanger is designed so that the exhaust air is led into the central area by fins arranged adjacent to the exhaust air inlet and is distributed from the central area to the peripheral area by the other fins.

In order to prevent the exhaust air flowing into the heat exchanger from flowing directly to the peripheral area instead of the central area, a flow barrier to the peripheral area is arranged at the fins through which the exhaust air is induced to the central area, which block the direct flow to the peripheral area for the inflowing exhaust air.

According to one embodiment of the invention, an insulation layer is arranged between the water heat exchanger and the air heat exchanger, and the heat exchanger is arranged on the side of the insulation layer facing the liquid reservoir.

Accordingly, it is possible to insulate the area of the water heat exchanger from that of the air heat exchanger, whereby the combination of the water heat exchanger with the heat exchanger, the air heat exchanger and the insulation layer can be provided as an assembly group which is inserted into the outer shell. A device designed in this way can both be easily transported to the site of use and can be quickly installed in the intended free space after completion of the excavation works. By providing an outer frame on the insulation layer, the appropriate insulation effect can be completed after insertion of the unit to the outer shell.

In one embodiment, the insulation layer has passages for the exhaust air directed to the peripheral area or is designed in such a way that the exhaust air flows past the outside of the insulation layer so that the exhaust air can be directed to the air heat exchanger as extract air. Alternatively or additionally, the outer frame is designed in such a way that the exhaust air can flow through between the insulation layer and the outer shell.

In one embodiment, an exhaust air inlet is arranged at a recess in the insulation layer through which the exhaust air flows into the heat exchanger below the insulation layer. Alternatively, the exhaust air inlet may be formed on the outer frame.

In the following, some embodiments are explained in more detail with reference to the figures. They show:

In the figures, identical or functionally similar components are given the same reference signs.

Figure 1:
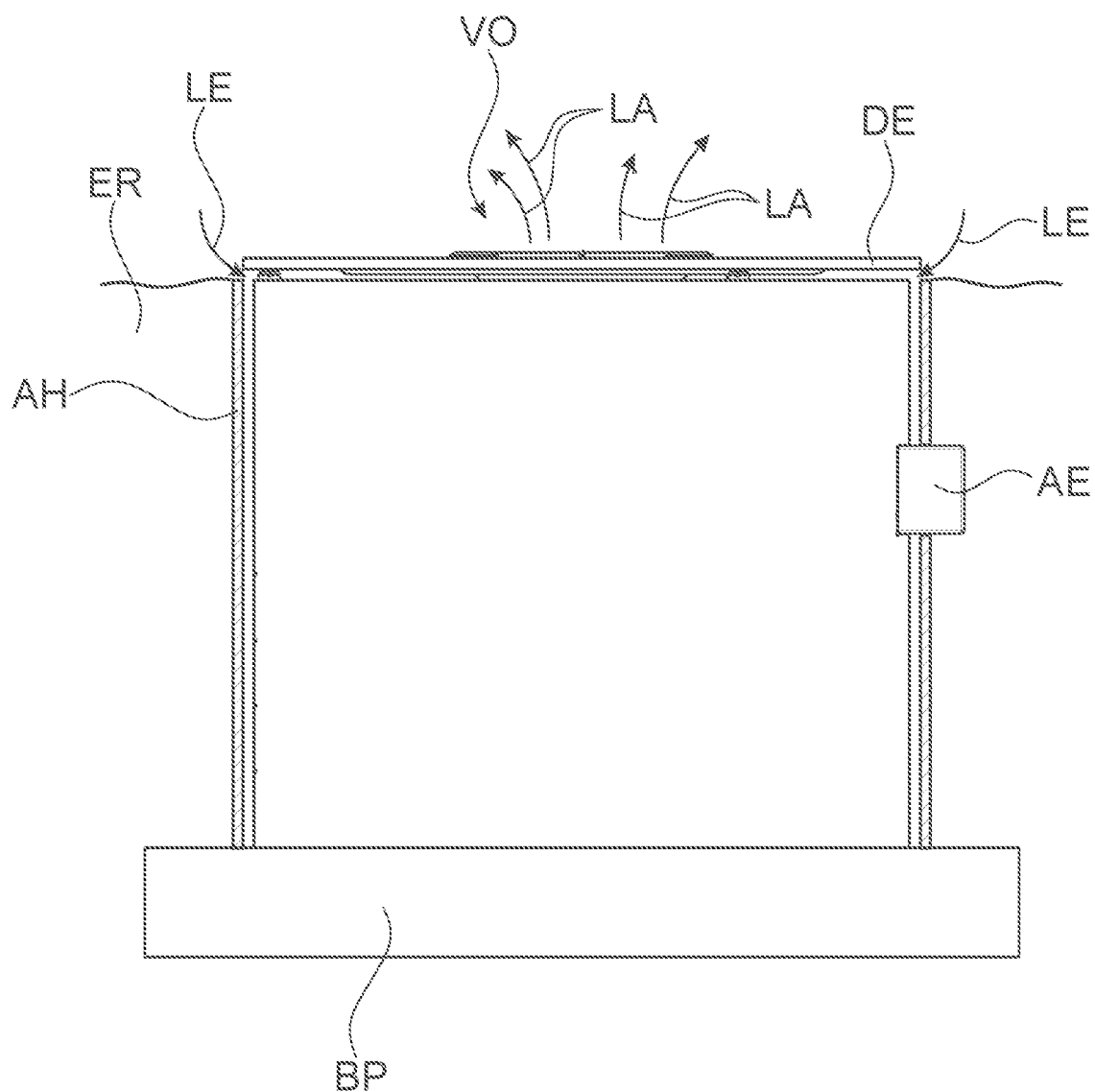
FIG. 1 shows a side view of an embodiment of a device.

FIG. 1 shows a side view of an embodiment of a device VO for energy transfer and energy storage in a fluid reservoir.

The device VO is typically installed in the exterior of a building which is to be heated or cooled by means of the device VO. To enable a simple installation of the device VO, first the foundation to be installed is provided, whereby here typically a concrete slab BP can be provided as a base. Furthermore, soil ER is removed from the outside of the building so that an outer shell AH can be laid on the concrete slab BP. Before the outer shell AH is fixed, a line section is typically laid to a heat pump housed in the building, which is connected to the device VO via a connection unit AE. Exhaust air from the building is also fed to the device VO via the connection unit AE.

For a material-saving design of the outer shell AH, it can be provided to insert a placeholder inside the outer shell AH before the device VO is installed, which acts as a stabilising core and is intended to prevent bulging of the outer shell AH. Typically, the outer shell AH is designed with respect to its height in such a way that the device VO comes to rest completely or almost completely below ground level of the soil ER. For the operation of the device VO, however, it is important that an external air inlet LE lets ambient air flow into the interior of the device VO and can let it flow out via an air outlet LA. For this purpose, the device VO is provided on its top side with a cover DE which almost completely covers the cross-section of the outer casing AH, leaving only a circumferentially arranged slot which can be used at least in sections as an outdoor air inlet LE.

The cover DE shown in FIG. 1 as well as the upper side of the soil RE form an almost flat surface, whereby the outer shell AH is typically designed in the form of a cylinder with a circular cross-section, which is arranged over its entire axial height in the soil ER. However, in other embodiments, it may be possible for the device VO to partially protrude above the top of the soil, so that the external air inlet LE could also be via a cylindrical external area. Instead of an outer shell AH, a protective grille or the like would then be fitted here between the surface of the soil ER and the cover DE, for example.

The shape of the device VO can be round as well as polygonal with respect to the foundation. Other shapes, such as elliptical or suchlike, are not excluded.

Figure 2:
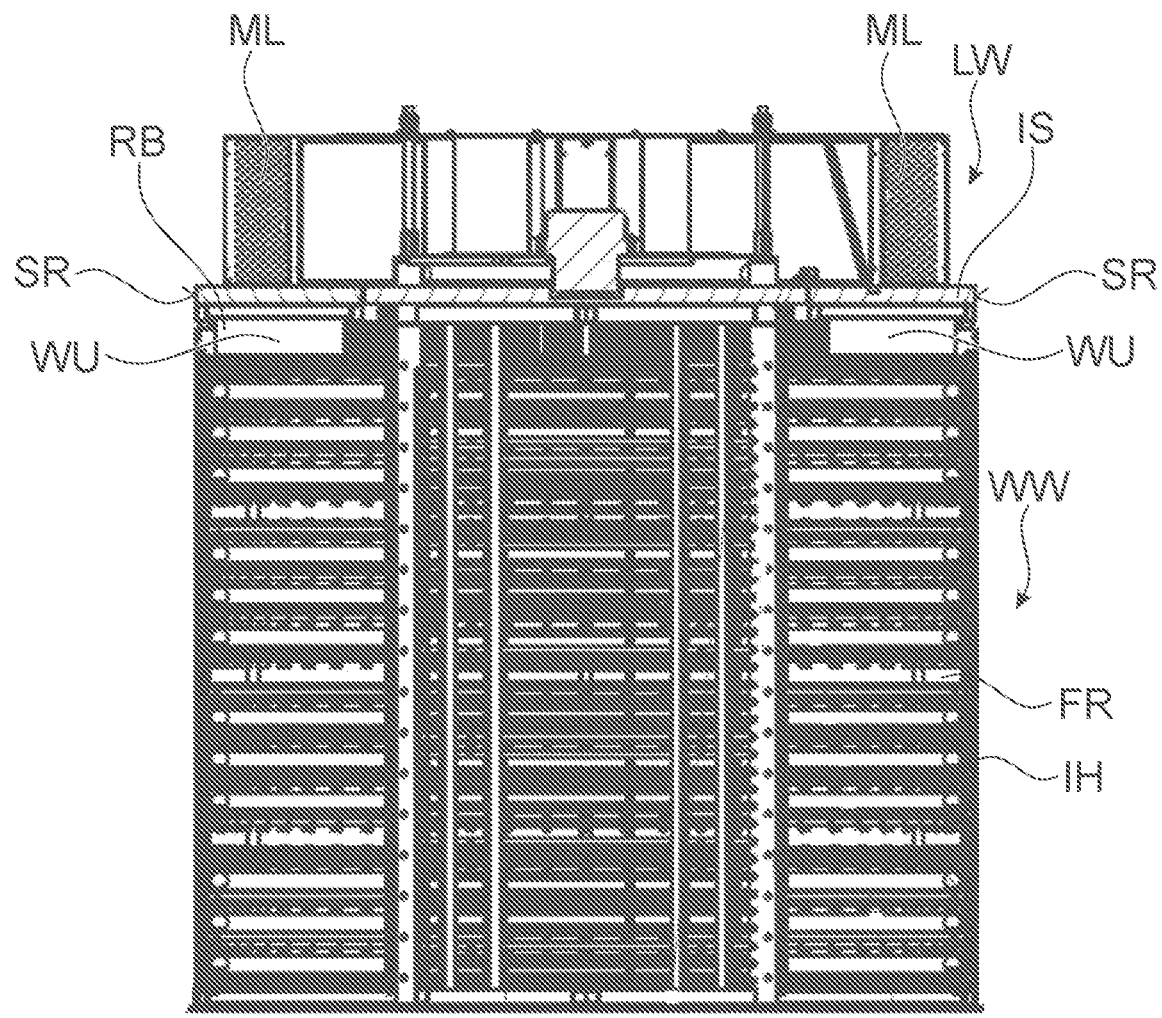
FIG. 2 shows the interior of the device in a longitudinal section.

FIG. 2 shows the interior of the device VO in a longitudinal section. For the sake of clarity, the outer shell AH is not shown.

The device VO is composed of an air heat exchanger LW and a water heat exchanger WW, the water heat exchanger WW having a liquid reservoir FR formed inside an inner shell IH and resting on the bottom plate BP. At the top, the water heat exchanger WW is separated from the air heat exchanger LW by means of an insulation layer IS, which can be additionally sealed with respect to the outer shell AH by an outer frame to be inserted subsequently. Thus it is possible to lead the unit consisting of air heat exchanger LW, insulation layer IS and water heat exchanger WW as a joint unit inside the outer shell AH, whereby by means of the outer frame an insulation can be subsequently created between the space in the air heat exchanger LW through which the air inlet LE lets the outdoor air flow and the space in the water heat exchanger WW.

After filling the liquid reservoir FR of the water heat exchanger WW, it can be particularly provided for that the inner shell IH is pressed in the direction of the outer shell AH due to a flexible design, which enhances additional stabilisation of the outer shell AH against the surrounding soil ER.

The water heat exchanger WW comprises circularly wound tubes arranged within the liquid reservoir FR. Typically, the liquid reservoir FR will be filled with water, although other liquid media, such as paraffin solutions or suchlike, are not excluded. Again, appropriate inlet tubes or outlet tubes will provide a connection to the heat pump located in the building, typically with a water-glycol solution flowing through the pipes to provide energy transfer or storage.

The embodiment example of the air heat exchanger LW has multiple metal fins ML arranged in several blocks. Here, the metal fins ML are typically made of aluminium for weight reduction reasons, while tubes connecting the metal fins ML may be made of copper. Ambient air, also referred to as outdoor air, flows around the metal fins ML, whereby the ambient air is induced via the outdoor air inlet LE by means of a fan VE to the air outlet LA on the cover DE. The inlet and outlet tubes of the metal fins ML are connected to the heat pump located in the building via the connection unit AE.

On the side of the insulation layer IS facing the liquid reservoir FR, a heat exchanger WU with a disc-shaped basic form is arranged. The heat exchanger WU is designed to direct the incoming exhaust air via the liquid reservoir FR into a circumferential peripheral area RB of the water heat exchanger WU, so that energy is transferred from warm exhaust air to the liquid in the liquid reservoir FR.

From the peripheral area RB, the exhaust air then flows as extract air into the air heat exchanger LW, where the extract air flow and the ambient air flowing into the air heat exchanger mix. The extract air can flow past the side edge SR of the insulation layer IS after flowing through the heat exchanger WU. To make this possible, the outer frame, if present, between the insulation layer IS and the outer shell AH can be designed accordingly and have, for example, recesses. Alternatively or additionally, recesses can be provided for in the insulation layer IS.

As can be seen in FIG. 2, fifteen groups of circularly wound tubes are arranged one above the other in the water heat exchanger WW. Each of these groups is supplied via its own inlet tube and its own pump, which is connected to the heat pump from a distributor. The number of groups can, of course, be varied according to the target output depending on the size of the liquid reservoir FR.

Figure 3:
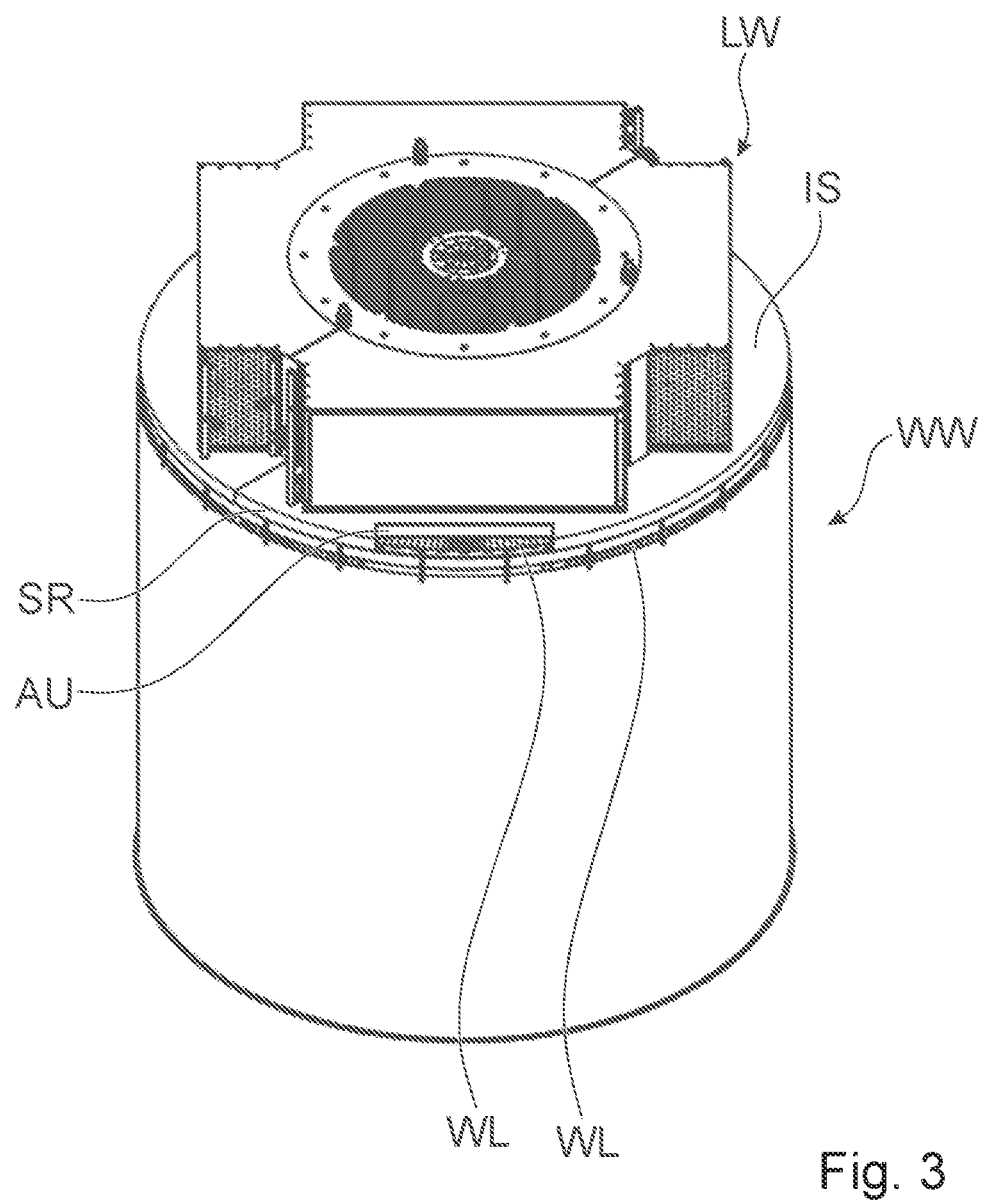
FIG. 3 shows the interior of the device in a three-dimensional representation.

FIG. 3 shows the interior of the device VO with the air heat exchanger LW and the water heat exchanger WW in a three-dimensional representation.

In the insulation layer IS is a recess serving as an exhaust air inlet AU, through which exhaust air from the connection unit AE is introduced into the heat exchanger WU. For this purpose, a pipe or shaft, which are not shown for the sake of clarity, can lead from the connection unit AE to the recess.

The exhaust air let in through the exhaust air inlet AU is first directed from the recess arranged at the edge into a central area ZB of the heat exchanger WU, and from there it is distributed radially to the circumferential edge area RB of the heat exchanger WU. The heat exchanger WU is partially immersed in the liquid reservoir FR. The warm exhaust air consequently flows over the surface of the heat exchanger WU that is not covered with liquid, so that an energy exchange occurs between the part of the surface of the heat exchanger WU that is covered with liquid and the liquid in the liquid reservoir FR, during which the heat of the exhaust air is at least partially transferred to the liquid. Then the exhaust air, already partially cooled via the heat exchanger WU, flows past the side edge SR of the insulation layer IS into the air heat exchanger LW and can mix with the ambient air flowing into the air heat exchanger LW. Since the energy of the exhaust air is transferred to the liquid in the area close to the surface, recirculation, which is not shown in the figures, may be necessary. Alternatively, it is also possible to operate the uppermost group of circularly wound tubes immediately adjacent to the heat exchanger WU in such a way that its pump is always activated or is activated during controlled periods of time, so that the temperature is balanced inside the entire liquid reservoir FR via the circulation of the operating liquid of the heat pump inside the tubes.

Figure 4:
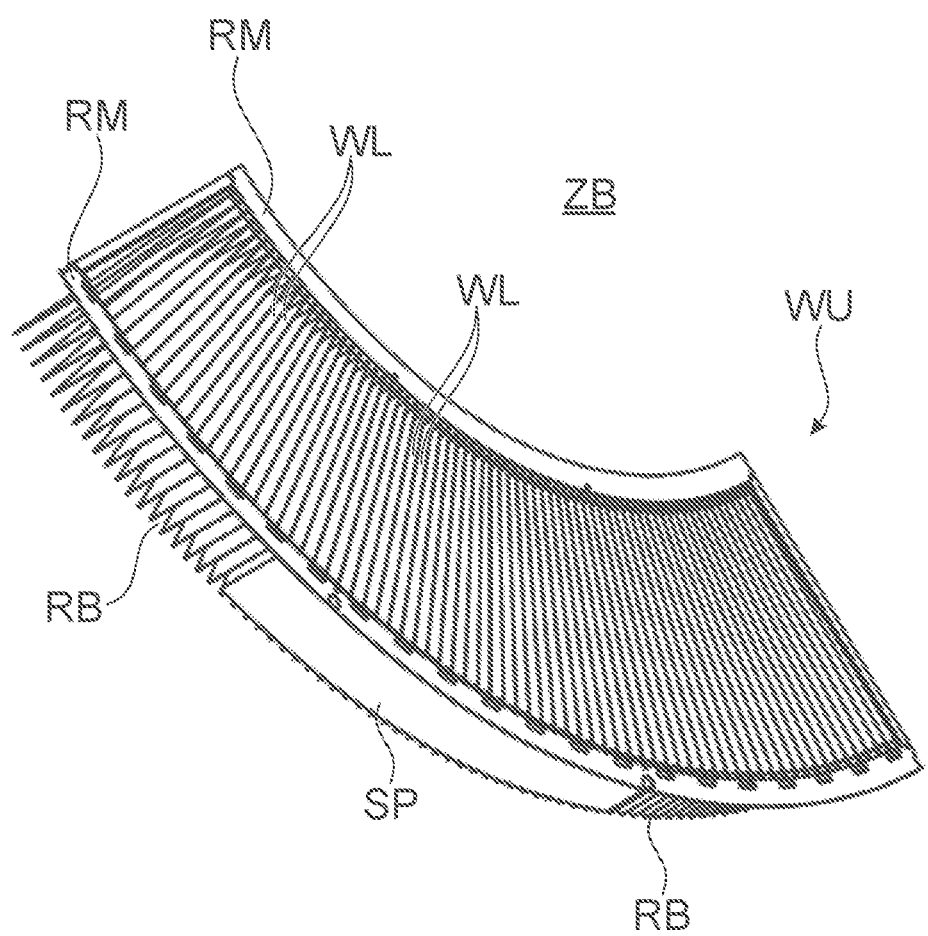
FIG. 4 shows a section of an embodiment of a heat exchanger in a three-dimensional representation.

FIG. 4 shows a three-dimensional section of the heat exchanger WU in the water heat exchanger WW. It has a basic disc-shaped form, of which only a detail of the disc-shaped section is shown, in which the exhaust air also flows in.

The heat exchanger WU has multiple, preferably metal, fins WL which run radially at least in certain areas. By area-wise radial it is understood that the direction in which they run has at least one radial component. Preferably, the fins WL run straight and radially from the inside to the outside. An alternative design is curved. Preferably, the fins WL are arranged perpendicular to the longitudinal axis of the water heat exchanger WW. In an alternative embodiment, they can be designed transversed or curved from top to bottom in order to influence the flow of the exhaust air flowing through. The fins WL can also be seen in gaps between the individual components in FIG. 3.

The blades WL direct the incoming exhaust air flow in a radial direction. The exhaust air flowing in from above through the exhaust air inlet AU at the edge is first directed by the fins WL, which are arranged adjacent to the exhaust air inlet AU, into the central area ZB. From there, the exhaust air is distributed by the circumferentially arranged, radially designed fins WL and led to the circumferential peripheral area RB of the heat exchanger WU. A flow barrier SP on the fins WL, which direct the exhaust air into the central area ZB, prevents the exhaust air from flowing directly to the peripheral area RB and exiting there instead of first flowing into the central area ZB. This would significantly reduce the performance of the heat exchanger WU, as the energy exchange with the liquid would only take place to a very limited extent due to the short distance over the liquid surface. The flow barrier SP is a curved plate at the radial ends of the fins WL, which direct the exhaust air into the central area ZB.

The heat exchanger WU may be attached to the insulation layer IS or the outer frame, for example. In this embodiment example, the fins WL are fixed between two concentric circular frames RM, which are fixed to the insulation layer IS. Typically, a few hundred, in the example shown about 900 such fins WL made of aluminium are arranged, which are for example 10 cm high and covered with liquid over half their height during operation.

The features described above and in the claims, as well as those which can be taken from the figures, can be advantageously realised both individually and in various combinations. The invention is not limited to the described embodiments, but can be varied in many ways within the scope of skill in the art.

The invention claimed is:

1. A device for energy transfer and for energy storage in a liquid reservoir (FR), the device (VO) comprising a water heat exchanger (WW) and an air heat exchanger (LW) arranged above the water heat exchanger (WW), wherein the water heat exchanger (WW) is arranged in a liquid reservoir (FR), and wherein the device (VO) comprises an outdoor air inlet (LE) from which an outdoor air flow can be induced to an air outlet (LA) through the air heat exchanger (LW), comprising a heat exchanger (WU) which is designed to direct exhaust air flowing in from an exhaust air inlet (AU) for energy transfer via the liquid reservoir (FR) into a peripheral area (RB) of the heat exchanger (WU), from which the exhaust air can be supplied as an extract air flow to the air heat exchanger (LW), in which the outdoor air flow and the extract air flow mix.

2. The device according to claim 1, wherein the exhaust air inlet (AU) is arranged at a distance from the outdoor air inlet (LE) and above a liquid surface of the liquid reservoir (FR).

3. The device according to claim 1, wherein the heat exchanger (WU) is designed to first direct the exhaust air into a central area (ZB) and from there to distribute it radially to the circumferential or nearly circumferential peripheral area (RB).

4. The device according to claim 1, wherein the heat exchanger (WU) has radially designed fins (WL) at least partially.

5. The device according to claim 4, wherein the heat exchanger (WU) is designed such that the exhaust air is directed into the central area (ZB) through fins (WU) arranged adjacent to the exhaust air inlet (AU) and is distributed from the central area (ZB) to the peripheral area (RB) through the other fins (WL).

6. The device according to claim 5, wherein a flow barrier (SP) against the peripheral area (RB) is arranged on the fins (WL) through which exhaust air is guided to the central area.

7. The device according to claim 1, wherein an insulation layer (IS) is arranged between the water heat exchanger (WW) and the air heat exchanger (LW), and wherein the heat exchanger (WU) is arranged on the side of the insulation layer (IS) facing the liquid reservoir (FR).

8. The device according to claim 7, wherein the insulating layer (IS) has passages for the exhaust air directed to the peripheral area (RB) or is designed in such a way that the exhaust air flows past the side edge (SR) of the insulating layer (IS).

9. The device according to claim 7, wherein the exhaust air inlet (AU) is arranged at a recess of the insulation layer (IS).

10. The device according to claim 7, in which an at least partially circumferential outer frame is fitted as a seal between the insulating layer (IS) and the outer shell (AH), the exhaust air inlet (AU) being arranged in the outer frame and/or the outer frame being designed in such a way that the exhaust air can flow through.

11. The device according to claim 1, wherein the device (VO) is closed off at the top by a cover (DE) in such a way that the outdoor air flow from the outdoor air inlet (LE) to the air outlet (LA) can be induced by the air heat exchanger (LW).

12. The device according to claim 11, in which the outdoor air inlet (LE) is slot-shaped along the outer brim of the cover (DE).

13. The device according to claim 11, in which the cover (DE) with the air outlet (LA) is arranged centrally on the cover (DE), wherein a fan (VE) is preferably arranged below the cover (DE) at the air outlet (LA).

14. The device according to claim 1, wherein the liquid reservoir (FR) is surrounded by an inner shell (IH) which separates the device (VO) from an outer shell (AH) covering the inner shell (IH) from a bottom (BP), wherein the outer shell (AH) is at least partially embedded into the soil (ER).

* * * * *